United States Patent [19]

Dickman

[11] Patent Number: 4,504,903
[45] Date of Patent: Mar. 12, 1985

[54] CENTRAL PROCESSOR WITH MEANS FOR SUSPENDING INSTRUCTION OPERATIONS

[75] Inventor: Lloyd I. Dickman, Sudbury, Mass.

[73] Assignee: Digital Equipment Corporation, Maynard, Mass.

[21] Appl. No.: 385,976

[22] Filed: Jun. 7, 1982

Related U.S. Application Data

[63] Continuation of Ser. No. 59,039, Jul. 19, 1979, abandoned, which is a continuation of Ser. No. 848,202, Nov. 3, 1977, abandoned.

[51] Int. Cl.³ .............................................. G06F 9/30
[52] U.S. Cl. .................................................... 364/200
[58] Field of Search ............................... 364/200, 900

[56] References Cited

U.S. PATENT DOCUMENTS

| | | | |
|---|---|---|---|
| 3,366,929 | 1/1968 | Mullery et al. | 364/200 |
| 3,396,371 | 6/1968 | Waldecker | 364/200 |
| 3,593,313 | 7/1971 | Tomaszewski | 364/200 |
| 3,614,740 | 10/1971 | Delagi | 364/200 |
| 3,654,448 | 4/1972 | Hitt | 364/200 |
| 3,789,365 | 1/1974 | Jen | 364/200 |
| 3,858,182 | 12/1974 | Delagi | 364/200 |
| 3,959,777 | 8/1976 | Kimmel | 364/200 |
| 4,003,028 | 1/1977 | Bennett | 364/200 |
| 4,025,904 | 8/1977 | Adney | 364/200 |

Primary Examiner—Raulfe B. Zache
Assistant Examiner—David Y. Eng
Attorney, Agent, or Firm—Cesari and McKenna

[57] ABSTRACT

A central processor for use in a data processing system that is adapted for processing sequences of characters. Information identifying a string of characters to be examined, including an initial memory location of the first character in the sequence and the total number of characters in the sequence, is placed in working registers of the central processor. Other working registers in the central processor receive information corresponding to a predetermined characteristic, which may be a specific character or information identifying another character string. One of several character string instructions then can be processed. In response to a typical character string instruction, the central processor performs the function defined by the instruction in an iterative fashion as the central processor retrieves successive characters from a memory. During each iteration the central processor tests to determine whether any interruption conditions exist. If one does, the central processor suspends further operations in response to the instruction and services the interruption. When the interruption has been serviced, the central processor again retrieves the suspended instruction and begins processing the character string with the character which would have been processed if the interruption had not occurred.

5 Claims, 10 Drawing Figures

```
┌─────────────────────────────────┐
│ FIGS. 4A & 4B, STEP 81 OR 95 │
└─────────────────────────────────┘
                 │
   96┐           ▼
┌──────────────────────────────────────────────────────┐
│ MOVE THE STATUS INFORMATION FROM THE HIGH-ORDER      │
│ BYTE IN THE R4 REGISTER TO THE HIGH-ORDER BYTE IN    │
│ THE STATUS REGISTER IN THE REGISTER MEMORY 22 MASK   │
│ THE RETURN CODE IN THE HIGH-ORDER BYTE OF THE        │
│ STATUS REGISTER                                      │
└──────────────────────────────────────────────────────┘
   97┐           │
                 ▼
┌──────────────────────────────────────────────────────┐
│ CLEAR THE LOW-ORDER BYTE IN THE STATUS REGISTER AND  │
│ THE HIGH-ORDER BYTE IN THE R4 REGISTER               │
└──────────────────────────────────────────────────────┘
```

CENTRAL PROCESSOR WITH MEANS FOR SUSPENDING INSTRUCTION OPERATIONS

This is a continuation of application Ser. No. 059,039, filed July 19, 1979, now abandoned, which is a continuation of Ser. No. 848,202, filed Nov. 3, 1977, now abandoned.

CROSS REFERENCES TO RELATED U.S. PATENTS AND PUBLICATIONS

U.S. Pat. No. 3,614,740 issued Oct. 19, 1971 for DATA PROCESSING SYSTEM WITH CIRCUITS FOR TRANSFERRING BETWEEN OPERATING ROUTINES, INTERRUPTION ROUTINES AND SUBROUTINES and assigned to the same assignee as the present invention;

U.S. Pat. No. 3,614,741 issued Oct. 19, 1971 for DATA PROCESSING SYSTEM WITH INSTRUCTION ADDRESSES IDENTIFYING ONE OF A PLURALITY OF REGISTERS INCLUDING THE PROGRAM COUNTER and assigned to the same assignee as the present invention;

U.S. patent application Ser. No. 059,038 filed on July 19, 1979, now abandoned, which is a continuation of U.S. patent application Ser. No. 848,201 filed on Nov. 3, 1977, now abandoned for a CENTRAL PROCESSOR WITH INSTRUCTIONS FOR PROCESSING SEQUENCES OF CHARACTERS and assigned to the same assignee as the present invention; and

*Microcomputer Handbook*, Digital Equipment Corporation, 1977.

BACKGROUND OF THE INVENTION

This invention generally relates to data processing systems and more specifically to a central processor that is adapted for processing data in the form of sequences of characters.

A conventional central processor for a data processing system has a characteristic instruction set that includes program control instructions and arithmetic-logic instructions. Branch instructions and jump instructions are examples of program control instructions. Instructions for performing addition, substraction, logical AND, logical OR, and similar functions are examples of arithmetic-logic functions.

Normally such a central processor includes interruption circuitry that enables a program to be interrupted in response to some event, such as the striking of a key on an input device or the arrival of the heads of a moving head disk drive at a selected track. This circuitry, however, is not activated unitl the end of the processing cycle for the instruction then being processed; that is, when all the data operations that are defined by the instruction have been completed.

In the co-pending U.S. patent application Ser. No. 059,058 there is disclosed a central processor that is adapted to respond to additional instructions, called character string instructions, thereby to process data in the form of a sequence of characters called a character string. These character string instructions process individual characters in the string by retrieving individual characters in succession from a memory unit and, after each such retrieval, processing that character in accordance with a function defined by the character strng instruction. Thus, the central processor response to a character string instruction is an iterative process involving a retrieval and processing step for each iteration.

Conventional interruption circuitry is also operable with the instructions that are used to process character strings. However, such character string instruction defines a sequence that may involve many hundreds of thousands of iterations, each involving one or more memory transfer steps and a processing step. Therefore, the central processor may require an extraordinary amount of time to process all characters in the character string. In most applications this time will exceed the time in which the central processor should respond to the occurrence of an event. The actual time delay is called "interrupt latency", and the maximum interrupt latency for any central processor ought to approximate the interval required to process a program control or arithmetic-logic instruction involving one or two operands.

Some known central processors do process instructions that define a large number of operands. Generally these central processors receive an interruption, stop processing the instruction, and store in memory sufficient information to restart the instruction at some intermediate point after the central processor responds to the interruption. More specifically, one such central processor contains an extra bit that indicates that the instruction has been suspended at some intermediate point thereby to indicate expressly that the instruction has been suspended. Another central processor limits suspension capacity to a few instructions. These prior central processors have relatively little information that must be retained. For example, a PDP11 central processor manufactured and sold by the assignee of this invention and described in U.S. Pat. No. 3,614,740, comprises interruption circuitry that stores the "state" of the processor by transferring the program count and processor status to memory.

Character string instructions described in the copending patent application are much more complex than the instructions normally processed by such a central processor. There are many intermediate results which must be save if the instruction is to be suspended at some intermediate point and then restarted successfully at that point None of the foregoing approaches is adapted for a solution to the problem of suspension when character string instructions are involved. For example, the addition of an extra bit to indicate expressly whether an instruction has been suspended is more costly and complex than it might seem. As previously indicated, conventional interruption techniques in the PDP11 central processor introduce unacceptable interruption latency.

Therefore, it is an object of this invention to provide a central processor in which operations in response to a specific instruction can be suspended to minimize interruption latency.

Another object of this invention is to provide a central processor that enables instructions to be suspended and subsequently restarted at an intermediate point.

Still another object of this invention is to provide a central processor that enables instructions to be suspended and that efficiently saves critical information concerning the instructions at the time that it is suspended.

SUMMARY OF THE INVENTION

In accordance with this invention, the central processor responds to a predetermined set of character string instructions. More specifically, the central processor responds to a specific character string instruction by processing a succession of characters. During each iteration a character is retrieved from the memory and processed. In addition, a test determines whether an interruption signal exists. If it does, further operations in response to the character string instruction are suspended. The central processor stores the state of the machine as part of the operation of the character string instruction prior to a normal interruption sequence that stores the character string address and processor state. When the interruption routine has been completed, the central processor retrieves the suspended character string instruction and restores the machine state. Moreover, it begins processing the character string with the character that as to be processed during the interrupted iteration.

This invention is pointed out with particularity in the appended claims. The above and further objects and advantages of this invention maybe better understood by referring to the following detailed description taken in conjunction with the accompanying drawings.

DESCRIPTION OF AN ILLUSTRATIVE EMBODIMENT

General Discussion

Figure 1:
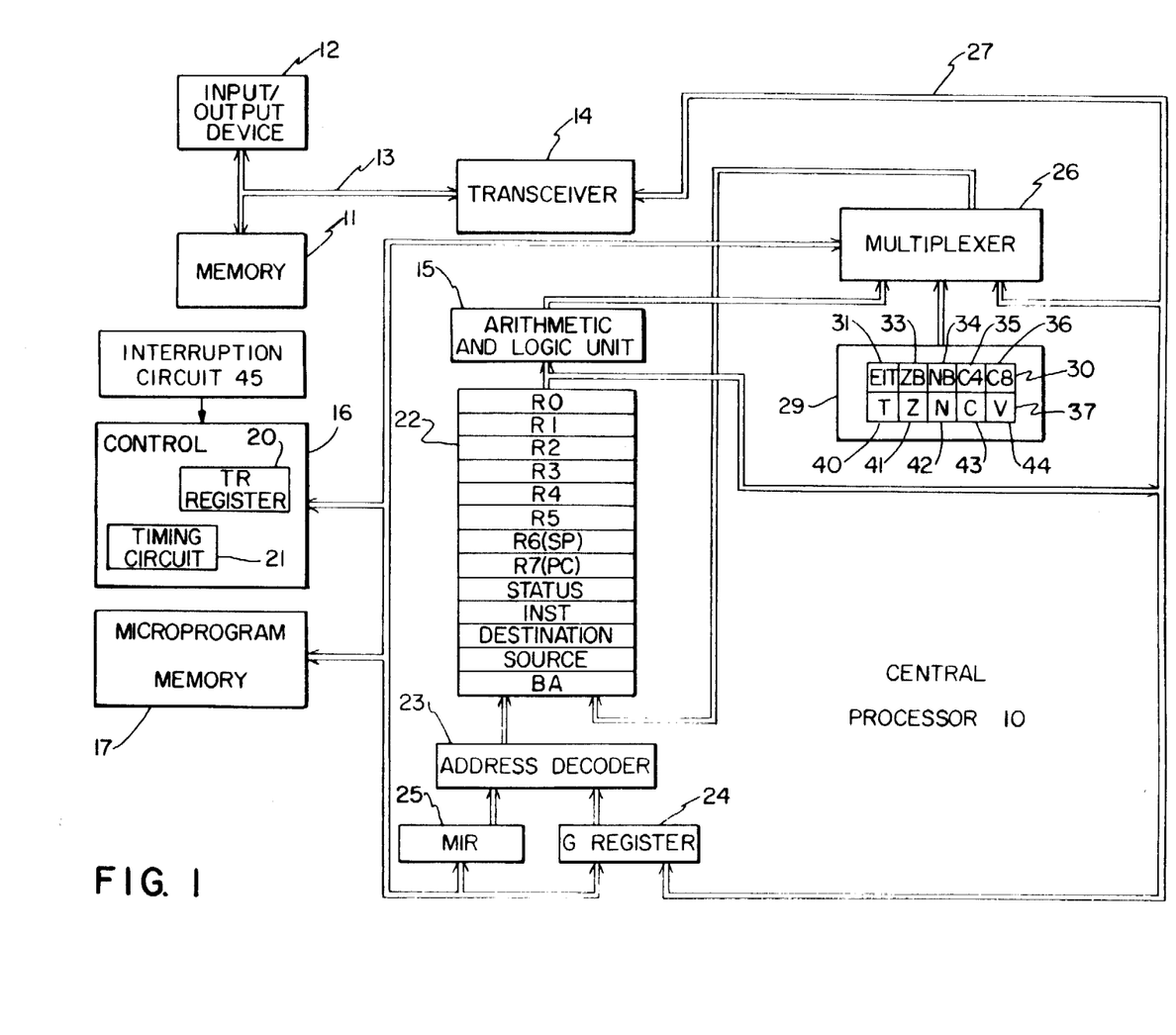
FIG. 1 is a block diagram of a central processor that is adapted for operating in accordance with this invention.

FIG. 1 is a block diagram of a central processor 10 that is sold by the assignee of this invention as an LSI11 microcomputer. This microcomputer is described in the previously identified *Microcomputer Handbook*. During operation the central processor 10 communicates with a random access memory 11 and peripheral devices represented by an input/output device 12 over a bus 13 that connects to a transceiver 14 in the central processor 10. The heart of the central processor 10 is an arithmetic-logic unit 15 and a control unit 16. U.S. Pat. Nos. 3,614,740 and 3,614,741 disclose a control unit for establishing data paths within the central processor. This control unit is implemented in combinatorial logic.

In recent years control units comprising microprogram responsive controllers and microprogram memories have replaced combinatorial logic as a means for establishing data paths in a central processor because microprogrammed controllers are easier to construct, are more flexible and are less expensive to implement. Thus, the data paths in the central processor 10 shown in FIG. 1 are established by such a microprogrammed controller including a control unit 16 and a microprogram memory 17. The control circuit 16 includes a TR register 20 and a timing circuit 21 that establishes the sequence of events in accordance with FIGS. 2 through 7. Although FIGS. 2 through 7 define specific sequences of data transfers within the central processor 10, it will become apparent that different sequences can also be used to implement this invention.

The arithmetic-logic unit 15 receives data from a register memory 22 and specifically from a register identified by an address supplied to an address decoder 23. The address is supplied either from a G register 24 or an MIR register 25. The G register 24 receives its address from the register memory 22, the transceiver 14 of the control unit 16 and microprogram memory 17, and it specifies the R0 through R7 registers defined in the foregoing U.S. patents. Addresses from the MIR register 25 identify other registers that are utilized as scratch pad registers by the central processor 10. As shown, these registers are identified as BA, SOURCE, DESTINATION, INST and STATUS registers respectfully. The MIR register 25 also can address the R6 and R7 registers, so there is an overlap of the registers addressed by the G register 24 and the MIR register 25.

The output from the arithmetic-logic unit 15 passes through a multiplexer 26 back into a designated register in the register memory 22. It is also possible for data to be supplied into the register memory 22 through the multiplexer 26 from an internal bus 27 that connects to the transceiver 14 and from a flag circuit 30. All transfers to the transceiver 14 are from the register memory 22. All the foregoing operations are defined in the proper sequence by the control circuit 16 operating in response to microinstructions from the microprogram memory 17.

The central processor 10 includes two basic sets of flags. One set 30, designated as "microprocessor flags" includes an enable interrupt test (EIT) flag 31 that is used during the suspension of the character string instructions in accordance with this invention. The microprocessor flags also include microprocessor condition code flags identified specifically as a ZB flag 33, NB flag 34, C4 flag 35 and a CB flag 36. These flags are responsive to specific ones of the microcode instructions and represent the state of the previous result from the arithmetic-logic unit 15 in response to a specific microcoded instruction. The ZB flag 33 indicates whether the result was a zero; the NB flag 34, whether the high-order bit from the operation is a ONE; the C4 flag 35, whether a carry bit position 3 occurred; and the CB flag 36 whether a carry from position 7 occurred. Another set of flags 37 correspond to the conventional central processor flags found in a PDP11 central processor. They include a T flag 40, Z flag 41, N flag 42, V flag 43 and C flag 44 that are arithmetic-logic condition flags.

Moreover, the central processor 10 disclosed in FIG. 1 includes an interruption circuit 45 that responds to INTERRUPTION signals. If an interruption occurs, the interruption circuit 45 terminates current operations and causes the central processor 10 to respond to the interruption. Initially the central unit 16 causes the contents of the R7, or PC, register and the status partially defined in the processor flags 37, to be transferred into the memory 11 at locations identified by the contents of the R6, or SP, register in the register memory 22. When the central processor 10 completes its response to the interruption, it returns to the interrupted program by retrieving the former contents of the R7 register and the processor status from the memory 11. The central processor does not store the contents of any other register in the register memory 22, so the interruption routine must include instructions that store the contents of all the registers to be used during the interruption routine and that retrieve that information upon termination. This procedure is described in U.S. Pat. No. 3,614,740 and is well known in the art.

Specific Discussion

With this understanding of the basic structure and operation of the central processor 10, it will helpful to discuss a character string instruction of the type to which this invention is directed. Therefore, the following discussion describes a character string instruction, a LOCC instruction, for detecting a predetermined character in a character string.

Specific information must be made available in order for a central processor to process a character string in response to any of these instructions. For example, the location of the character string in memory must be specified for each of the instruction. It also is necessary to specify the predetermined character that is to be detected. Although there are several approaches for identifying a character string in memory, this specific implementation utilizes two items of information: namely, the address of the initial, or most significant, character in the character string and the length of the character string. A single character can be specified directly in the program by the programmer.

In accordance with a specific embodiment of this invention, this specific character string instruction and other character string instructions are added to the conventional set of instructions that the several processor can process. Therefore, these instructions utilize operation codes that have not be assigned previously. Within the available operation codes it is not possible to specify an operation and also to identify the character string and characteristic in a single instruction. Therefore, each character string instruction assumes that information specifying the character string and characteristic have been transferred into predetermined working registers prior to processing the instruction itself. For example, an LOCC instruction is used to determine whether a character string instruction contains a predetermined character. To process the LOCC instruction in a PDP11 central processor the length and starting address for the character string are transferred to the R0 and R1 registers respectively while the predetermined character is stored in the low-order byte of the R4 register. As will become apparent from the later discussion, the high-order byte of the R4 register should be cleared prior to the execution of any character string instruction.

In response to the LOCC instruction, the central processor 10 uses the arithmetic-logic unit 15 to undergo a sequence of iterative operations. During each iteration, the central processor 10 initially tests the R0 register to determine whether all the characters in the character string have been examined. If they have, the Z flag 41 in the flag set 37 is set; otherwise it is cleared. Assuming that characters are still to be retrieved, the central processor 10 retrieves the next character in sequence and compares it with the designated character in the low-order byte of the R4 register. If the character is found, no further iterations occur. When the iterations terminate the Z flag 41 is cleared and indicates success in locating the predetermined character. Therefore, the programmer can simply use a BME or BEQ instruction to control subsequent operations. Moreover, if the predetermined character has been found, the R0 and R1 registers identify its position in the string and its location in the random access memory 11.

1. LOCC instruction

The specific implementation of the LOCC instruction in an LSI11 central processor is shown in the flow diagrams of FIGS. 2 through 5. These Figures and following description define the transfers of data and logical decisions which occur during the processing of these specific character string instructions. They also specify the order, and hence the timing, of the transfers and provide a complete description that will enable anyone or ordinary skill in the art to adapt to any central processor to implement this invention either in a microprogram controlled central processor or a central processor controlled by combinatorial logic.

Figure 2A:
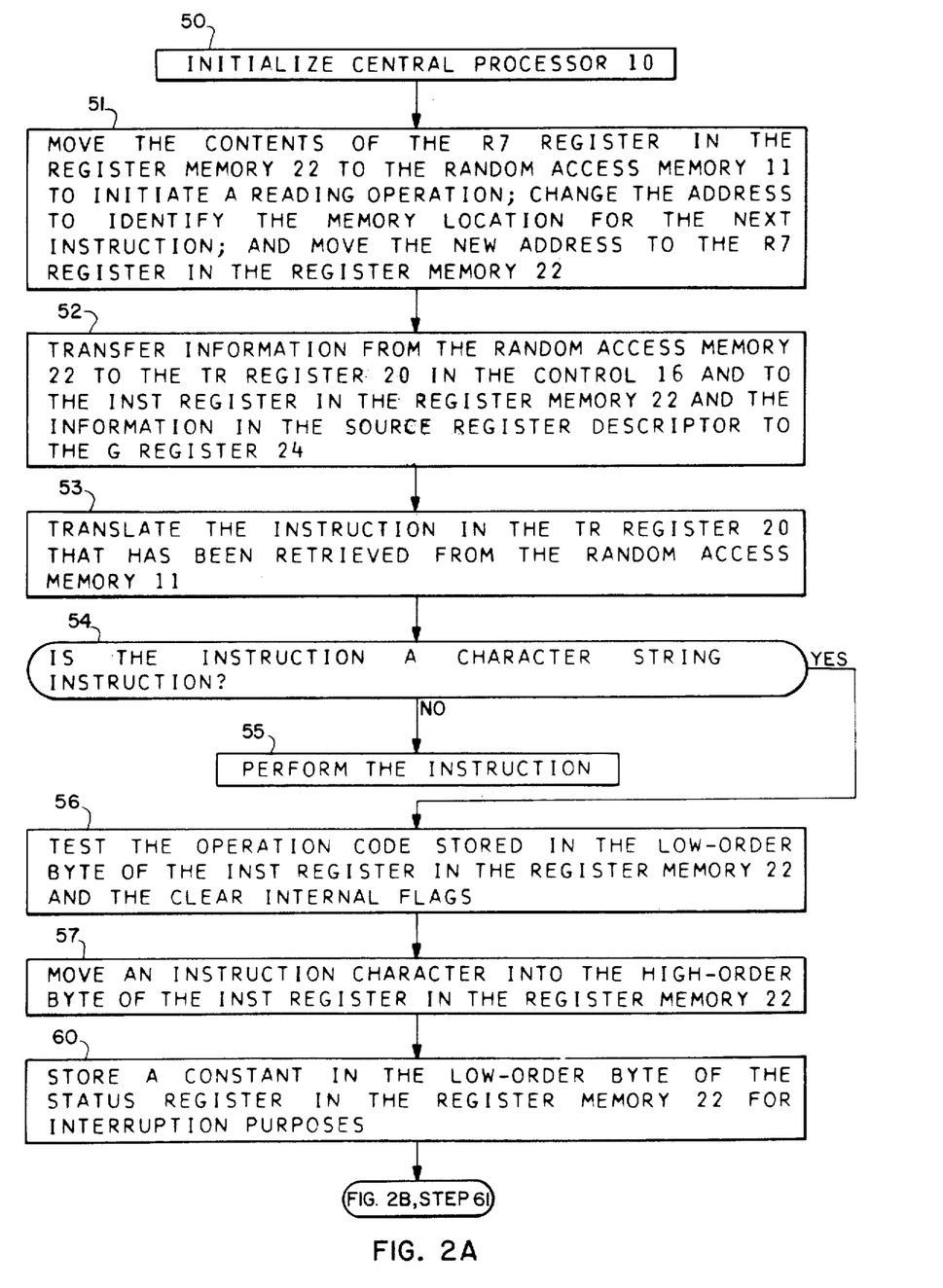
FIGS. 2A and 2B constitute a flow diagram that describes the operation of the central processor in FIG. 1 during the retrieval of instructions from memory.

Now referring to FIGS. 1 and 2A, operations begin in step 50 by initializing the central processor 10 in a conventional manner. In step 51, the operation for fetching an instruction from the memory 11 begins by moving the contents of the R7 register as an instruction address through the transceiver 14 onto the bus 13. This transfer initiates a reading operation in the memory 11. The address from the R7 register additionally is altered in the arithmetic-logic unit 13 to the address of the next memory location in sequence and then transferred back to the R7 register in the register memory 22.

Once the memory 11 retrieves the information from the addressed location, the central processor 10 transfers, in step 52, this information through the transceiver 14 and into both the TR register 20 in the control unit 16 and the INST register in the register memory 22. The information in the source register descriptor portion of the instruction (a ZERO in each character string instruction) also is transferred into the G register 24 during step 52. Upon completion of the step 52, the G register 24 identifies the R0 register in the register memory 22. In step 53 the control 16 translates the instruction in the TR register 20. If the instruction is not one of the character string instructions, then the control 16, in step 54, diverts to step 55 which represents the microprograms for processing conventional LSI 11 instructions.

In a normal program, the central processor 10 would transfer information to the specific registers in the register memory 22 in response to conventional instructions (e.g., a NOV instruction) immediately before retrieving and processing a character string instruction. Once the character string instruction is retrieved, the central unit 16 shifts operations to processor 10 to step 56 whereby the central processor 10 tests the low-order instruction byte in the INST register. The character string instructions lie within a predetermined numerical range of operation codes that are distinguished by the contents of low-order byte on the INST register. All the character string instructions have the same high-order byte. Moreover, each of these instructions is identified uniquely within the set by one particular character and that character is then moved into the high-order byte position of the INST register in the register memory 22 in step 57.

The control unit 16 places a constant in a low order byte of the STATUS register in the register memory 22 during step 60. This information is used if the instruction is suspended as described later with respect to FIGS. 6A, 6B and 7.

Figure 2B:
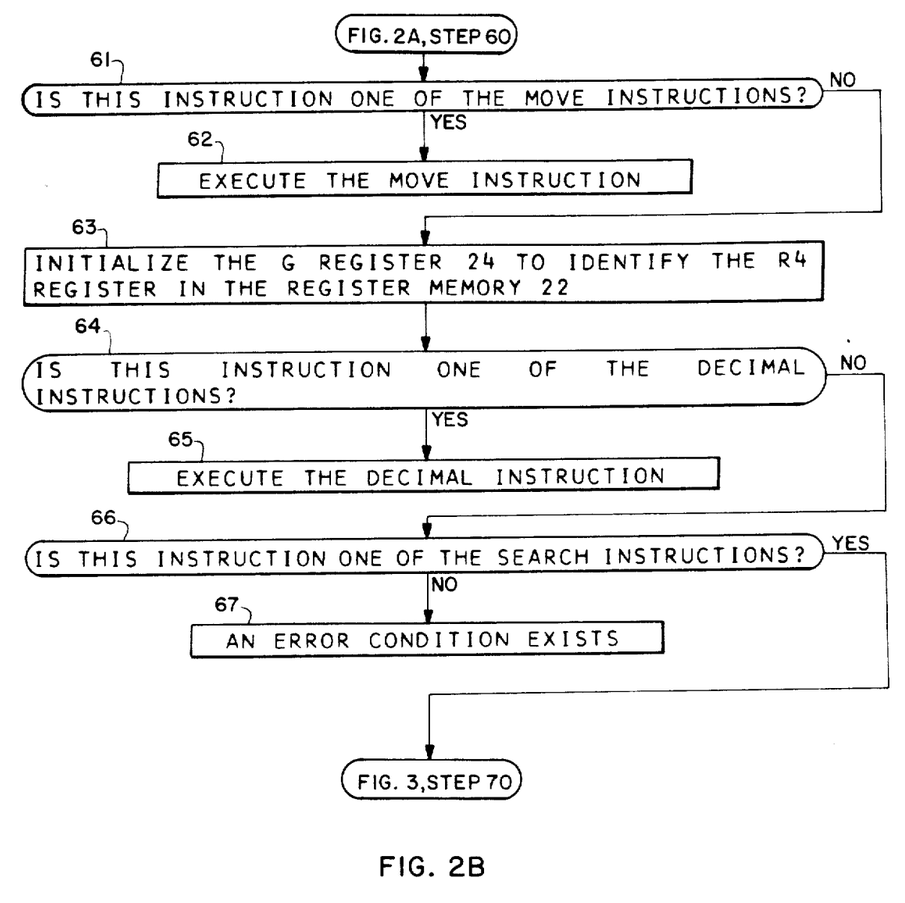

The character string instructions are decoded in steps 61 through 67 in FIG. 2B. If the instruction is one that moves a character string to a new location in memory it is decoded and processed on steps 61 and 62. If the instruction is a decimal instruction for processing decimal strings in accordance with an arithmetic function or if the instruction is a search instruction to which this invention relates, the G register 24 receives information that identifies the low-order byte position of the R4 register in step 63. The central procesor 10 decodes and processes decimal instructions in steps 64 and 65. Otherwise it decodes a search instruction in step 66 or an error condition in step 67. If a search instruction is retrieved, the central processor 10 diverts to step 70 in FIG. 3 to process it.

Figure 3:
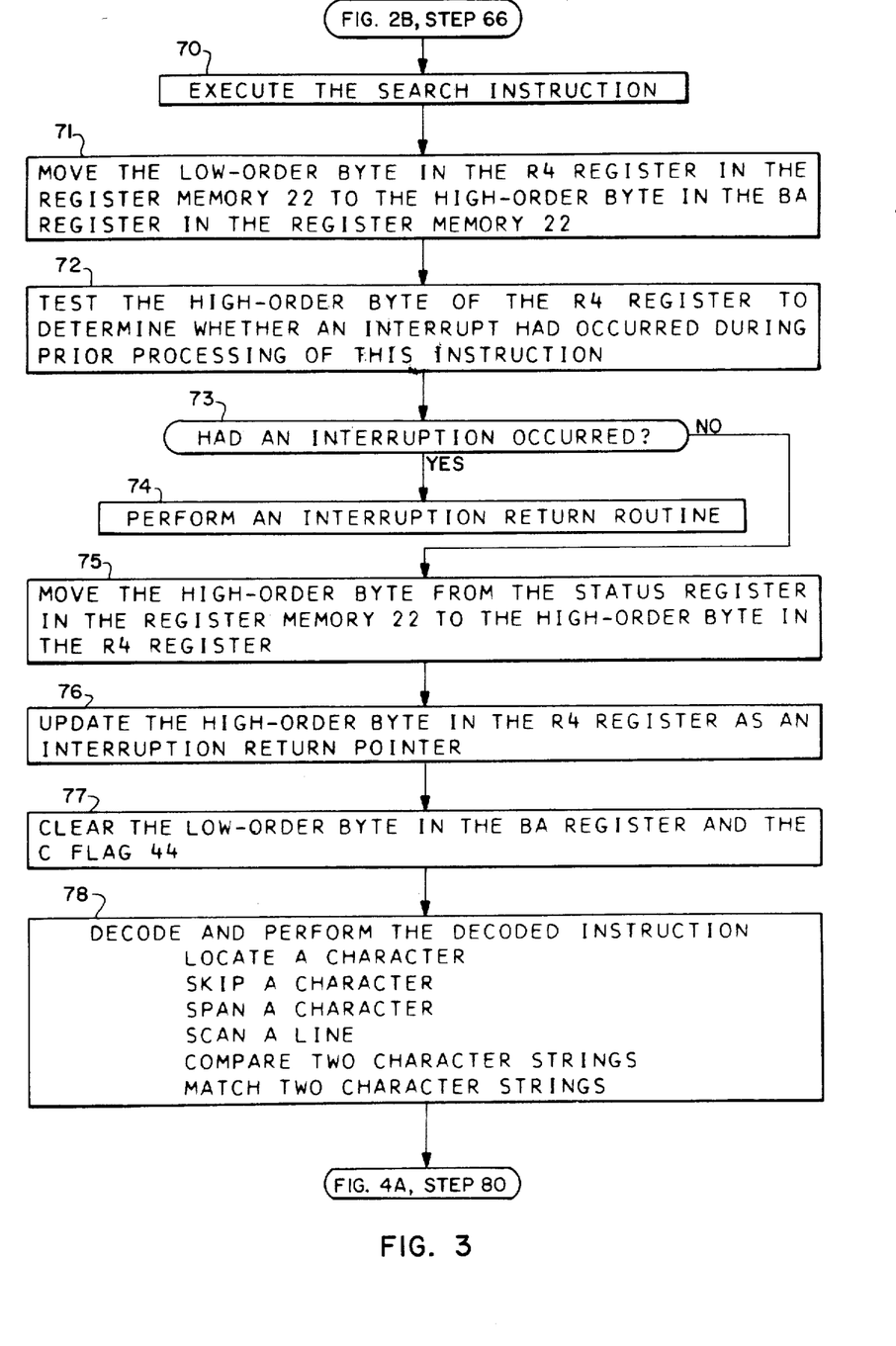
FIG. 3 is a flow diagram that describes the preliminary operation of the central processor in FIG. 1 in response to a character string instruction for searching a character string for a predetermined characteristic.

Now referring to step 71, FIG. 3, the central processor 10 moves the low-order byte of the R4 register to the high-order byte position in the BA register of the register memory 22. As described later, each time the search instruction is processed, the central processor ascertains whether it had previously been suspended in response to an interruption in step 72. If such an interruption has occurred, then step 73 diverts operation into an interruption return routine which is described in detail with reference to FIG. 7. If not, the central processor moves the information in the high-order bit position of the STATUS register in the register memory 22 to the high-order bit position in the R4 register, this information constitutes return information to be saved of the event of a subsequent interruption. This return information is updated to a current state in step 76. Step 77, which is processed either after step 76 or upon completion of the interruption return routine in step 74, clears the low-order byte in the BA register and the C flag 44. Then in step 78 the retrieved searching instruction is decoded.

Figure 4A:
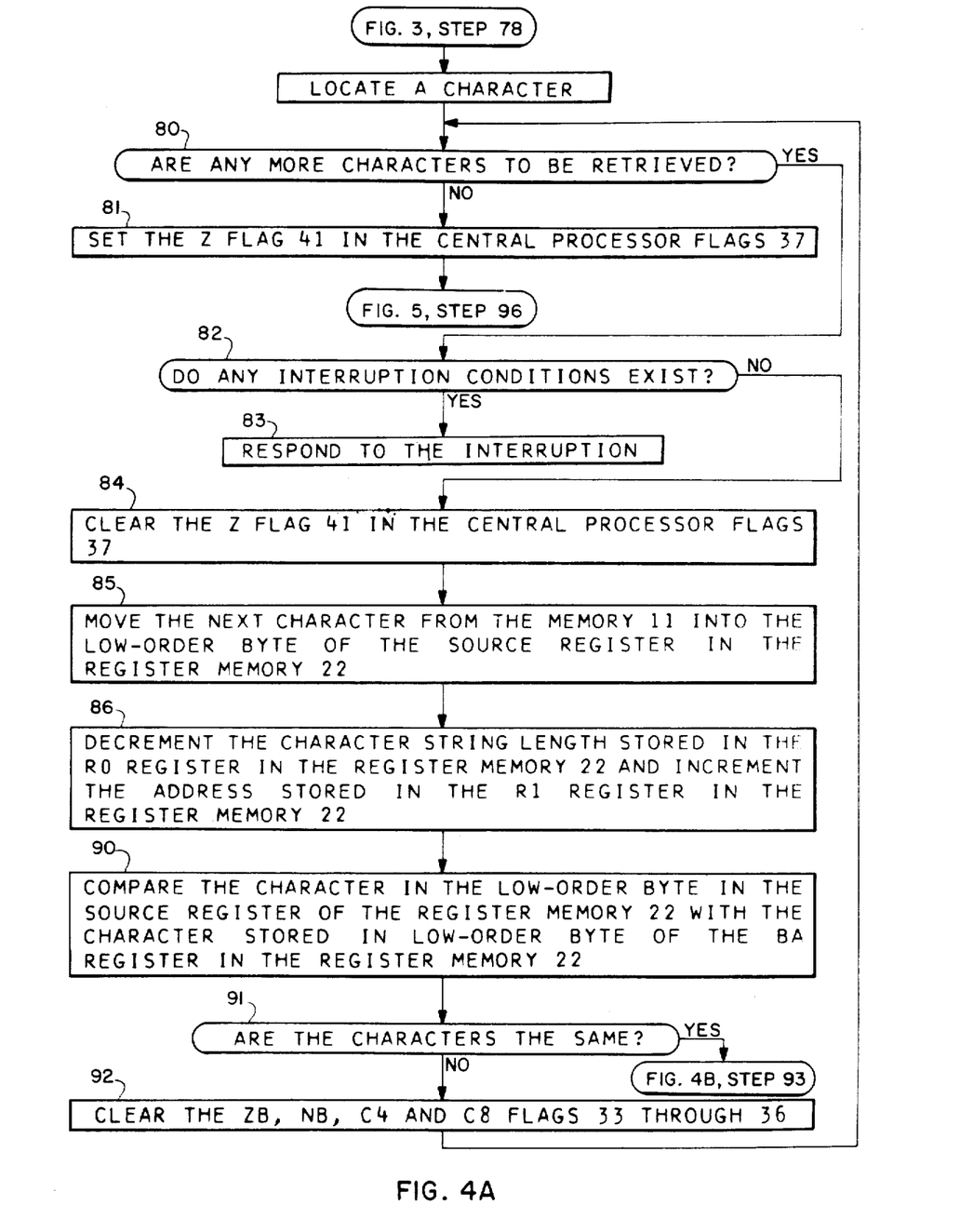
FIGS. 4A and 4B define specific operations of the central processor shown in FIG. 1 in response to a character string search instruction for locating a specific character in a character string.
Figure 4B:
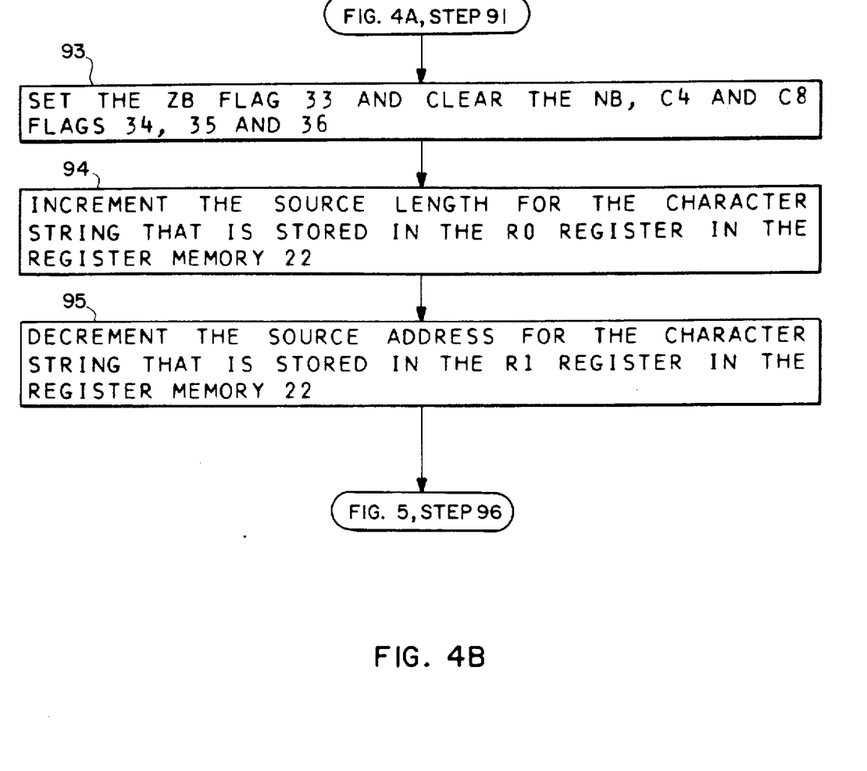

Now referring to FIGS. 1 and 4A, if the decoded character string instruction is a LOCC instruction, the central processor diverts from step 78 to step 80 which is the first step in a character retrieval sequence additionally comprising steps 81 through 86. The central processor 10 uses this same sequence when it processes other character string instructions. In step 80 the central processor determines whether any more characters are to be retrieved by testing the R0 register. If no more characters are to be retrieved, then the R0 register contains a ZERO, so this test sets the Z flag 41 (the Z signal is asserted or Z=1). Then the central processor processes the sequence shown in FIG. 5. If more characters are to be retrieved, step 80 branches to step 82. In step 82, the central processor 10 ascertains whether any interruption conditions exist. If they do, the central processor 10 suspends operation of the LOCC instruction and responds to the interruption in step 83 as described with respect to FIGS. 6A and 6B. Upon completion of the interruption, processor operation shifts back to step 74 in FIG. 3, and then returns to step 80 in FIG. 4A after performing the steps in FIG. 7 whereupon the system normally will divert to step 84 and clear the Z flag 41. In step 85, the central processor moves the next character from the memory 11 to the low-order byte position of the SOURCE register in the register memory 22 for comparison with the predetermined character stored in BA register in the register memory 22. The transfer of the next character in succession from the memory 11 in step 85 also includes step 86 wherein the central processor 10 decrements the character string length stored in the R0 register and increments the character address stored in the R1 register.

In step 90 the central processor 10 compares the two characters. If they are not identical, step 91 diverts to step 92 and clears the ZB flag 33. Then the central processor 10 returns to step 80. Thus, steps 80 through 92 are in a loop that the central processor 10 performs on an iterative basis either until all the characters in the string have been processed (step 82) or the character is found. When a character corresponding to the predetermined character is found, the central procesor 10, in step 93 shown in FIG. 4B, sets the ZB flag 33. Then in steps 94 and 95 the source length, stored in the R0 register, is incremented and the source address, stored in the R1 register, is decremented. Thus, when a character is located, the R0 and R1 registers identify respectively, the position of the located character in the character string and its address in memory.

Figure 5:
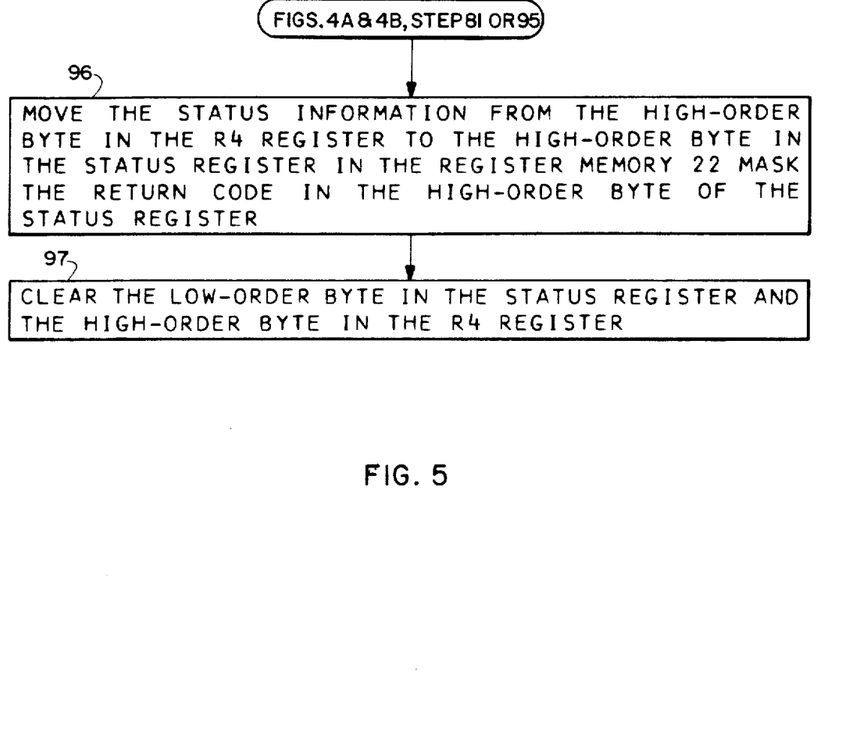
FIG. 5 defines specific operations of the central processor shown in FIG. 1 upon the completion of the steps that are defined in FIGS. 4A and 4B or of corresponding steps that are taken in response to analagous instructions.

Next the central processor completes its response to the LOCC instruction by performing the sequence depicted in FIG. 5. More specifically, the central processor 10, in step 96, moves the status information in the high-order byte of the R4 register to the corresponding byte in the STATUS register and masks the return code in that byte during the step 96. It then clears the low-order byte of the R4 register in step 97 to assure that it is in an original condition. Then the central processor 10 returns to step 51 in FIG. 2A.

2. Interruption Operation

As previously indicated, the programmer should clear the high-order byte of the R4 register immediately before the central processor 10 retrieves a character string instruction. With specific reference to the LOCC instruction, this can be done when the predetermined character is moved to the low-order byte of the R4 register. The central processor 10 sets the high-order byte to a non-zero value during processing and clears the byte upon completion. Thus, the high-order byte of the R4 register indicates whether the operation of this instruction has been suspended or not. In FIG. 3, step 72 tests the high-order byte on the R4 register, and step 73 controls subsequent operations based upon the suspension or non-suspension of the instruction.

When the central processor initially retrieves the instruction during the execution of a program, the high-order byte of the R4 register therefore is cleared and step 73 branches to step 75. Then the interrupt bit and T bit that normally are stored in the high-order byte of the STATUS register are conveyed to the high-order byte of the R4 register. The central processor 10 then adds a non-zero interrupt pointer to the high-order byte of the R4 register thereby to define a specific condition for the searching group of instructions. At this point it is only important to recognize that the high-order byte of the R4 register has a non-zero value.

Again referring to FIG. 4A, the central processor 10 performs the loop comprising steps 80 through 92. In step 82 the central processor 10 determines whether an interruption exists. If it does, the central processor 10 uses step 83 to respond to that interruption. That response is shown in detail in FIGS. 6A and 6B. Specifically, the central processor interruption circuit 45 forces the control unit 16 to transfer control to a predetermined location in the microcode memory 17. That constitutes the location for the initial microinstruction that performs the sequence shown in FIGS. 6A and 6B. During this sequence the central processor 10 conditions the G register 24 to address the R4 register in the register memory 22 as shown in step 100. The response to the different types of instructions is then controlled in step 101. In this step the central processor 10 determines whether the character string instruction being processed is an instruction for moving a character. The LOCC instruction is not such a character string instruction so the central processor 10 transfers to step 102. Step 102 is an initial step that transfers predetermined information concerning the state of the machine from the INST, DISTINATION, SOURCE and BA registers into the memory 11 or the general purpose registers R0 through R5 in the register memory 22. For the LOCC instruction specifically, the contents of the INST register are moved directly into the memory 11 at a position specified by the R6 register that acts as a stack pointer. In step 103 the contents of the high-order byte of the STATUS register and the lower-order byte of the BA register are transferred to the memory 11. In step 104 the processor status is moved from the high-order byte of the status register and the low-order byte of the BA register into a location in a memory stack defined by the contents of the 26 register after it is decremented. The central processor, in step 105, uses a mask to eliminate the return code portion of the high-order byte of the STATUS register. Thus, the STATUS register then contains information concerning the state of the flags in the flag set 37, plus priority information. In step 106 the enable trace flag 32 is cleared thereby to disable any tracing operations during the remainder of the transfer to the interruption routine.

Figure 6A:
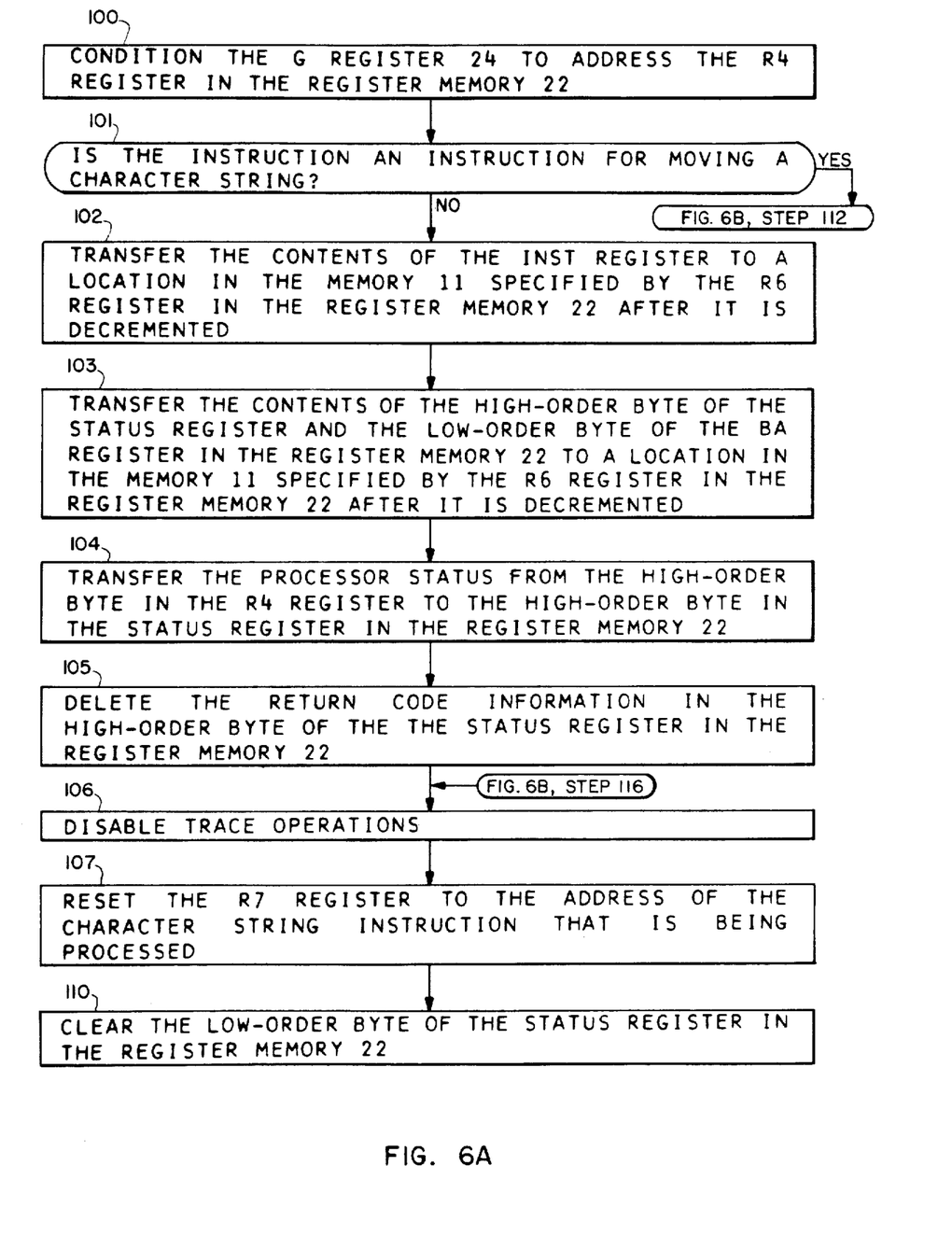
FIGS. 6A and 6B define the operation of the central processor in FIG. 1 in response to an interruption.
Figure 6B:
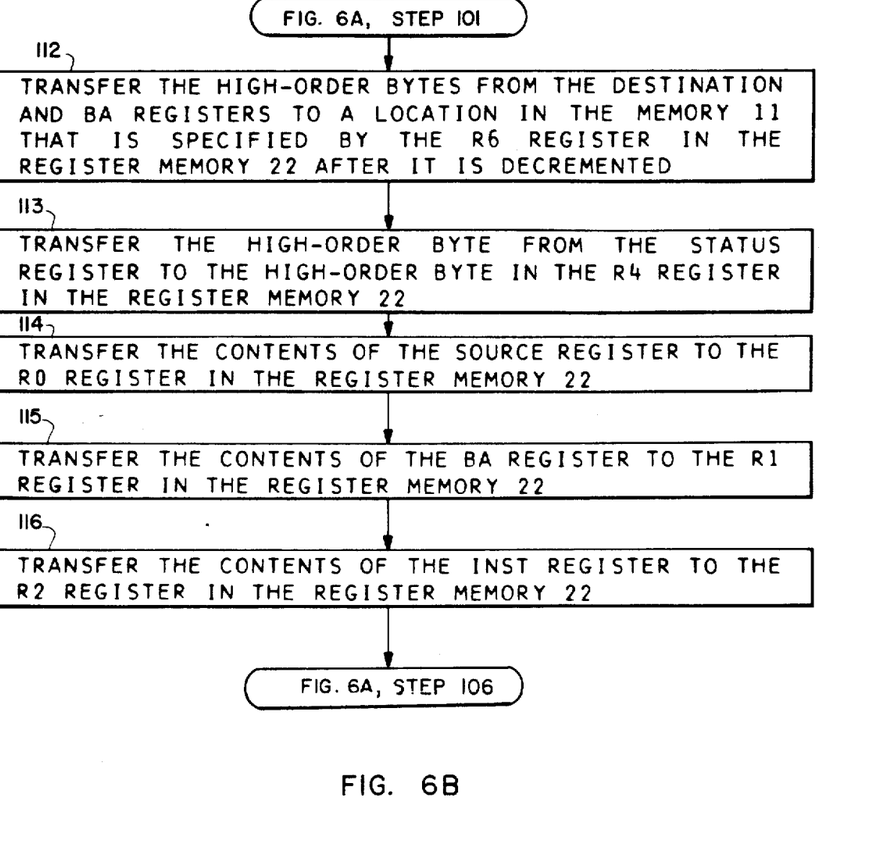
Figure 7:
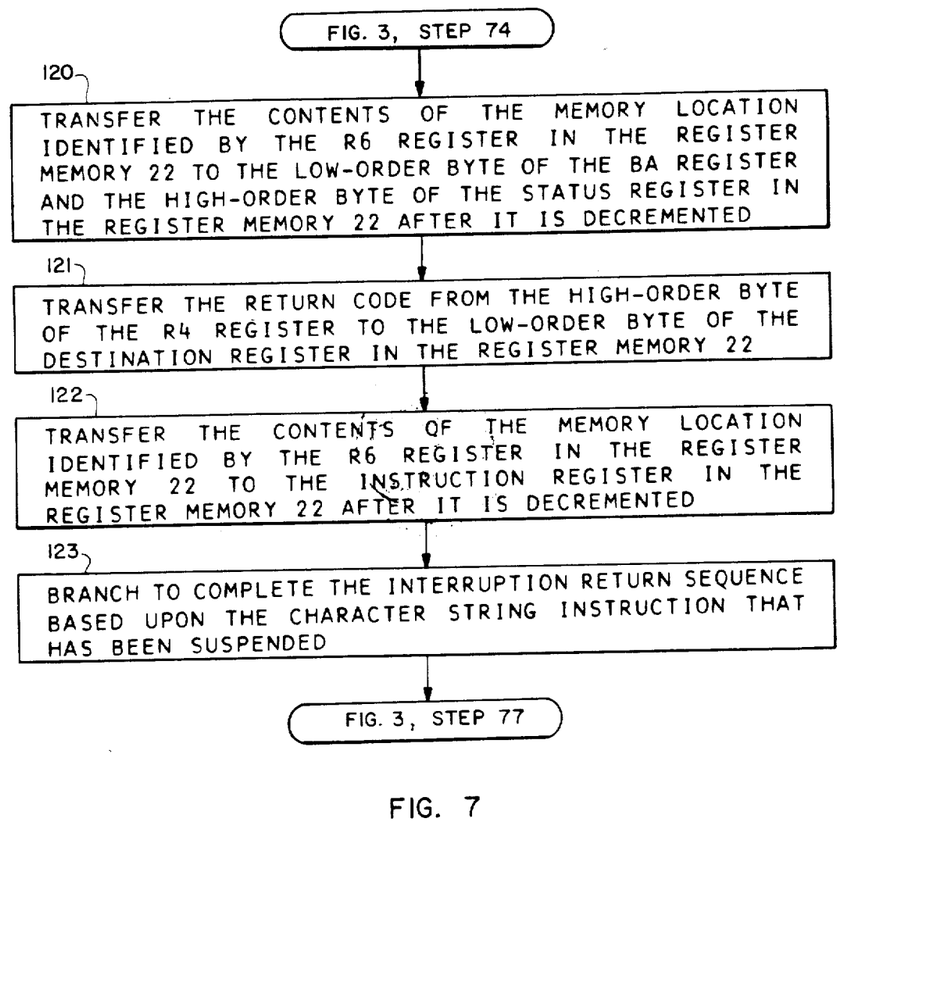
FIG. 7 defines the operation of the central processor in FIG. 1 after it has responded to the interruption.

It will also be apparent that it will be necessary to retrieve the character string instruction after the interruption has been processed. However, the program counter, i.e., the R7 register, was altered in step 51 in FIG. 2A to specify the location of the next instruction in sequence. Therefore, central processor 10 utilizes step 107 to reset the R7 register so that it identifies the location of the character string instruction. Then the low-order byte of the STATUS register is cleared in step 110. At this point the control unit 16 enables the interruption unit 45 to respond to the interruption signal as it normally would. Specifically, the central processor 10 stores the contents of the STATUS register which contains the status of the condition flags 37 and some priority information in the high-order byte and a 0 in the low-order byte into the memory 11 at successive locations identified by the R6 register. Then the interruption circuit 45 enables the control unit 16 to transfer to the interruption routine.

As previously indicated, another set of operations occur if the character string instruction moves a character string from one location to another. In this case, step 101 transfers to step 112 in FIG. 6B which transfers the high-order byte from the DISTINATION and BA registers to a location in the memory 11 that is specified by the R6 register acting as a stack pointer. Next the central processor transfers the high-order byte from the STATUS register, which specifies the status of the machine and the return code, to the high-order byte of the R4 register during step 113. In step 114, the contents of the SOURCE register are transferred to the R0 register and in steps 115 and 116 the contents of the BA register and INST register are transferred to the R1 and R2 registers respectively. Then the central processor transfers back to step 106 in FIG. 6A to disable tracing operations, reset the R7 register and clear the low-order byte in the STATUS register. Thus, at the time any of the character string instructions is suspended, the state of the machine at the time of suspension is saved either in the general purpose registers in the register memory 22 or in the memory 11.

If the interruption routine is written to utilize any of the R0 through R7 registers, the interruption routine also contains instructions for initially storing the contents of those registers in the memory 11. At the completion of the interruption routine there will also be instructions for retrieving that information from the memory 11 for transfer to the corresponding once of the R0 through R7 registers. Thus, when the interruption routine is completed, the register memory 22 will assume the same state as it had upon completion of step 110.

When such interruption has been completed the control 16 performs step 51 in FIG. 2A. Now the R7 register points to the suspended character string instruction so that it is retrieved from the memory 11 again. However, in step 72 shown in FIG. 3 the high-order byte of the R4 register will be a non-zero value. So step 73 branches to step 74 which includes steps 120 through 123 shown in FIG. 7 for a LOCC instruction. In step 120, the information stored in the memory 11 in step 103 is returned to the low-order byte of the BA register and the high-order byte of the STATUS register. Next, the central processor 10 retrieves the return code incorporated in the high-order byte of the R4 register and transfers that information to the DESTINATION register in the register memory 22 during step 121. In step 122, the INST register is restored with the information that was stored in step 102 in FIG. 6. The central processor 10, in step 123, utilizes the information in the low-order bytes of the STATUS and DESTINATION registers to branch in accordance with the specific character string instruction that is being processed. In the case of the LOCC instruction, step 123 causes the central processor 10 to branch back to step 77 in FIG. 3.

Now returning to FIG. 5, step 97 clears the high-order byte in the R4 register when the character string instruction has been processed completely. Thus, the high-order byte of the R4 register is returned to its original state.

CONCLUSION

In accordance with the objects of this invention, the control 16 and microcode memory 17 are adapted to operate in conjunction with the interrupt circuit 45 in accordance with the various steps shown in FIGS. 2 through 7. If an interruption condition occurs, the central processor 10 responds to that interruption during an intermediate iteration of its overall processing. This provides an interrupt latency which is well within acceptable standards. Moreover, when the interruption routine is completed, the central processor returns to that intermediate iteration. It is not necessary for the entire processing sequence to begin all over again, and this further improves overall operating speed of the central processor 10. Finally, it will be seen that the important information, including intermediate results, is saved during such a suspension. More specifically, this information is moved from the scratch pad registers either into the memory 11 or into general purpose registers in the register memory 22 that will be retained through the interruption routine or be stored in the memory 11. Thus, upon return, the central procesor 10 simply begins processing the character string instruction where it was suspended. No additional state need be added to the processor to suspend and resume instructions correctly.

The foregoing discussion has been limited to a specific character string instruction and the processing of that instruction in a specific central processor. However, an understanding of this specific implementation will enable a person of ordinary skill in the art to implement other instructions of an equivalent nature in this specifically disclosed central processor or other central processors. Therefore, it is the object of the appended claims to cover all such variations and modifications as come within the true spirit and scope of this invention.

What we claim as new and desire to secure by Letters Patent of the United States is:

1. A digital data processor for connection to a memory, the processor including a program counter, processing means for processing information in response to machine instructions identified in sequence by the program counter from a predetermined set of machine instructions, the processing means including a private memory means for storing information useful in processing the machine instructions, said private memory means including temporary memory means used by said processing means to store intermediate results during the processing of a machine instruction, decoding means for receiving each machine instruction and controlling the processing means in response thereto, interruption signal generating means for generating an interruption signal in response to a predetermined condition in the data processing system, interruption means responsive to the interruption signal for interrupting the sequence of machine instruction processing, interruption processing means responsive to the interruption means for processing the interruption, and special instruction processing means for enabling said processing means to respond to a special machine instruction for processing a succession of data entities in an iterative fashion during an instruction cycle comprising:
    i. state storage means in said private memory means, initialized to a predetermined state at the beginning of processing of the special machine instruction, for storing information concerning the state of completion of the special machine instruction when said interruption means detects an interruption signal;
    ii. retrieval means responsive to the decoding means for causing the processing means to iteratively retrieve, during each instruction cycle for the special machine instruction, a data entity from the memory means;
    iii. interruption detecting means for ascertaining the existence of an interruption signal during each iteration;
    v. means responsive to the receipt of an interruption signal for altering the contents of the program counter to identify the special machine instruction being processed;
    v. means responsive to the receipt of an interruption signal and to the decoding means for storing selected information in the temporary memory means in said memory means, the information being selected on the basis of the special machine instruction being processed; and
    vi. restoring means for retrieving the information from said memory means and storing it in the temporary private memory means thereby to enable said processing means to resume the operation of the special machine instruction whose operation has been interrupted.

2. Special instruction means for a data processing system as recited in claim 1 wherein the private memory means includes a plurality of general purpose registers and said state storage means further includes:
    i. first means operable when the processing means processes a special instruction for altering the condition of said state storage means to a second state thereby to indicate that the special instruction is being processed,
    ii. second means responsive to said interruption detecting means for storing in the private memory means and the memory means the contents of the state storage means during the operation of the interruption processing means, and
    iii. third means responsive to the processing means for altering the condition of said state storage means to the first state thereby to indicate the completion of the processing of the special instruction.

3. Special instruction means for a data processing system as recited in claim 2 wherein said state storage means includes means for retrieving the contents of the state storage means from the private memory means and the memory means.

4. Special instruction means for a data processing system as recited in claim 1 wherein the central processor includes a plurality of general purpose registers, wherein the program counter is altered during each retrieval of an instruction from the memory means to specify the location of the next instruction in sequence and wherein:
    A. said state storage means further includes:
        i. first means operable when the processing means processes a special instruction for altering the condition of said state storage means to a second state thereby to indicate that the special instruction is being processed,
        ii. second means responsive to said interruption detecting means for storing in the general purpose registers and the memory means the contents of the state storage means during the operation of the interruption processing means, and
        iii. third means responsive to the processing means for altering the condition of said state storage means to the first state thereby to indicate the completion of the processing of the special instruction, and
    B. said program counter storage means includes means responsive to said interruption detecting means for resetting the program counter to the address of the special instruction being processed.

5. Special instruction means for a data processing system as recited in claim 3 wherein the interruption means stores the contents of said program counter storage means in the memory means when the interruption means interrupts the processing means, wherein the interruption means retrieves the stored program counter contents after processing the interruption and wherein:
    A. said state storage means includes means for retrieving the contents of the state storage means from the general purpose registers and the memory means, and
    B. said program counter storage means includes means for transferring the retrieved contents to the program counter.

* * * * *